F. E. CARLSON.
DETACHABLE HANDLE.
APPLICATION FILED SEPT. 20, 1917.
1,350,641.
Patented Aug. 24, 1920.
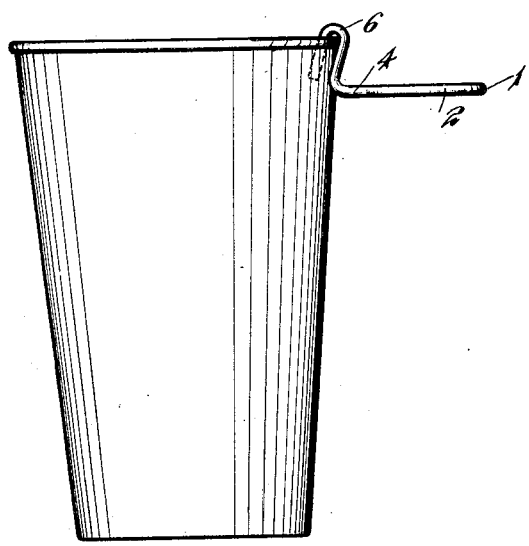
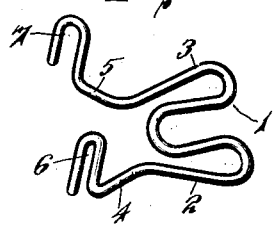
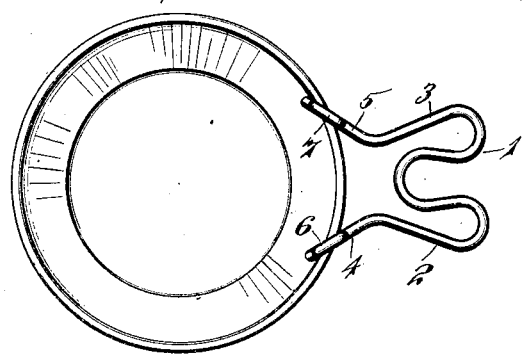
INVENTOR.
Frederick E. Carlson.
BY
his ATTORNEY.

UNITED STATES PATENT OFFICE.

FREDERICK E. CARLSON, OF NEW BRITAIN, CONNECTICUT, ASSIGNOR TO LANDERS, FRARY & CLARK, OF NEW BRITAIN, CONNECTICUT, A CORPORATION OF CONNECTICUT.

DETACHABLE HANDLE.

1,350,641.      Specification of Letters Patent.      Patented Aug. 24, 1920.

Application filed September 20, 1917. Serial No. 192,400.

*To all whom it may concern:*

Be it known that I, FREDERICK E. CARLSON, a citizen of the United States, and a resident of New Britain, in the county of Hartford, State of Connecticut, have invented certain new and useful Improvements in Detachable Handles, of which the following is a specification.

This invention has for its object the provision of an article of the character described having features of novelty and advantage. This is designed to provide a detachable handle for articles such as metal drinking cups but it is of course adapted to a wide variety of uses.

In the drawings—

Figure 1 is a side view of a cup with handle attached thereto.

Fig. 2 is a top view thereof.

Fig. 3 is a detail perspective view of a handle.

Referring to the drawings, the handle is preferably of wire comprising a central base part 1, side arms 2 3, having diverging forward portions 4 5, having at their ends upstanding loops 6 7, which provide recessed engaging portions. It will be seen that the planes of these loops diverge so that normally the loops are out of alinement. By pressing side arms 2 3, together the loops are moved toward alining position until they will fit down over the edge of the cup then, if the side arms are released the spring of the metal throws the loops apart and causes them to bind on the edge of the cup and very securely engaging it. The handle may well be made from other than wire stock. It is adapted for use with any form of cup whether it be round or otherwise and provides a very simple, inexpensive and practical arrangement.

I claim as my invention:—

1. A detachable handle comprising a pair of spaced engaging members of inverted U-shape whose planes are normally angularly disposed with reference to one another, said members being movable toward and away from one another to permit of the handle being applied to a container, and spring means tending to move said members to normal position.

2. A detachable handle comprising a pair of spaced engaging members adapted to fit over the edge of a cup, the plane of said engaging members being at other than a right angle with relation to the edge of a cup, and spring arms upon which said engaging members are mounted, normally tending to hold them apart from one another.

3. A detachable handle comprising a pair of spaced engaging members of inverted U-shape adapted to fit down over the edge of a cup, and spring arms upon which said engaging members are mounted, normally tending to move said members to cause the sides of each member to frictionally grip opposite sides of the cup wall.

4. A detachable handle comprising two resiliently connected members both of which have cup-engaging means, and one of which means comprises an inverted U-shaped part, the branches of which are arranged to grip a cup between them by an angular movement of said parts upon movement relative to each of said resiliently connected members.

FREDERICK E. CARLSON.